US011964759B2

United States Patent
Sabadash et al.

(10) Patent No.: US 11,964,759 B2
(45) Date of Patent: Apr. 23, 2024

(54) CONVERTIPLANE

(71) Applicants: Andrew Andreevich Sabadash, Kazan (RU); Alexander Vladimirovich Milevsky, Novosibirsk (RU)

(72) Inventors: Andrew Andreevich Sabadash, Kazan (RU); Alexander Vladimirovich Milevsky, Novosibirsk (RU)

( * ) Notice: Subject to any disclaimer, the term of this patent is extended or adjusted under 35 U.S.C. 154(b) by 0 days.

(21) Appl. No.: 17/634,177

(22) PCT Filed: Aug. 9, 2020

(86) PCT No.: PCT/RU2020/050182
§ 371 (c)(1),
(2) Date: Apr. 7, 2022

(87) PCT Pub. No.: WO2021/029790
PCT Pub. Date: Feb. 18, 2021

(65) Prior Publication Data
US 2022/0315217 A1    Oct. 6, 2022

(30) Foreign Application Priority Data
Aug. 9, 2019  (RU) .......................... RU2019125349

(51) Int. Cl.
*B64C 27/28*   (2006.01)
*B64C 37/00*   (2006.01)
(Continued)

(52) U.S. Cl.
CPC .............. *B64C 37/00* (2013.01); *B64C 27/28* (2013.01); *B64U 10/20* (2023.01); *B64U 30/297* (2023.01)

(58) Field of Classification Search
CPC ................................ B64C 27/28; B64C 37/00
See application file for complete search history.

(56) References Cited

U.S. PATENT DOCUMENTS

| 10,301,016 B1 * | 5/2019 | Bondarev | ............... B64C 15/12 |
| 2016/0046369 A1 * | 2/2016 | Watkins | ................... B64C 27/24 |
| | | | 244/7 A |

FOREIGN PATENT DOCUMENTS

| CN | 106800089 A | 6/2017 |
| FR | 2930839 A1 | 11/2009 |

(Continued)

OTHER PUBLICATIONS

International Search Report mailed Dec. 30, 2020 for International Patent Application No. PCT/RU2020/050182, which was filed Aug. 9, 2020 and published as WO/2021/029790 on Feb. 18, 2021 (Applicant: Andrew Andreevich Sabadash, et al. // Inventor: Andrew Andreevich Sabadash, et al. // (English translation: 2 pages).

(Continued)

*Primary Examiner* — Tye William Abell
(74) *Attorney, Agent, or Firm* — Troutman Pepper Hamilton Sanders LLP

(57) ABSTRACT

The invention relates to the field of aeronautical engineering, specifically to convertiplanes. A convertiplane comprises a fuselage, a control system, aerodynamic outer wings with aerodynamic control surfaces, an all-moving foreplane with aerodynamic control surfaces, a tail plane, and propulsion systems with propellers. The propulsion systems with propellers are arranged rotatably on tips of the foreplane and on the tail plane. The convertiplane is designed to permit the aerodynamic centre of pressure and the resultant thrust vector to coincide. The convertiplane is designed to permit the mutual dynamic and static scalar control thereof by operating the aerodynamic control surfaces and thrust vectoring of each of the propulsion systems. The propulsion systems arranged on the tips of the foreplane are capable of counterrotation of the propeller and are capable of dynamically displacing the centre of pressure and are also capable of displacing the axis of rotation of the front propulsion (Continued)

systems in the ZX plane. The propulsion systems have an axial degree of freedom, and are also capable of independently of one another controlling thrust vectoring and revolutions by controlling the pitch angle of the blades and the diameter thereof.

9 Claims, 8 Drawing Sheets

(51) Int. Cl.
   *B64U 10/20* (2023.01)
   *B64U 30/297* (2023.01)

(56) References Cited

FOREIGN PATENT DOCUMENTS

RU     2547950 C1    4/2015
RU     164555 U1    10/2016

OTHER PUBLICATIONS

Written Opinion mailed Dec. 30, 2020 for International Patent Application No. PCT/RU2020/050182, which was filed Aug. 9, 2020 and published as WO/2021/029790 on Feb. 18, 2021 (Applicant: Andrew Andreevich Sabadash, et al. // Inventor: Andrew Andreevich Sabadash, et al. // (English translation: 2 pages).

* cited by examiner

CONVERTIPLANE

CROSS-REFERENCE TO RELATED APPLICATIONS

This application is a National Stage Application of International Application No. PCT/RU2020/050182, filed Aug. 9, 2020, which claims priority to Russian Application No. 2019125349, filed Aug. 9, 2019, all of which are herein incorporated by reference in their entireties.

Field of technology to which the invention relates.

The invention relates to the field of aircraft engineering, specifically to convertiplanes.

BACKGROUND OF THE TECHNOLOGY AND PREREQUISITES FOR CREATING THE INVENTION

To date, aircraft of classical schemes, such as airplanes, helicopters, various types of multi-rotor vehicles, aero hybrids (which means a combination of an airplane and a helicopter) and rotorcraft are widely used.

Each of the above-mentioned schemes has its advantages and disadvantages, and aircraft of each scheme are suitable for specific tasks. Nevertheless, there are a number of tasks that aircraft of classical schemes cannot cope with, or do not cope with effectively.

When regarding the scope of modern requirements to drones, the disadvantages of classical schemes often outweigh the advantages of those. It significantly reduces the flight's reliability and, consequently, safety. And also it makes the use of unmanned aerial vehicles (UAVs) more expensive in various industries.

This not only slows down the development of the drone industry as a whole, but also creates a preconceived notion that unmanned technologies are too complex to operate, as well as leads to excessive and unjustified legislation restrictions adopted by regulatory authorities.

The most in-demand solution is a versatile aircraft, such as a convertiplane, effective versions of which are still not present on the market, as attempts to combine the aircraft of classic schemes have not yet led to tangible results.

The scheme declared in this document is the most effective aircraft scheme of the convertiplane, superior to all similar solutions existing today.

Disadvantages of Aircraft Schemes

Airplane: totally unable to hover in place, perform steady vertical takeoff and landing. Susceptible to external factors such as turbulence, wind speed. The control efficiency varies greatly with the oncoming flow speed. It is difficult and, most importantly, expensive to fully automate maintenance to create an autonomous solution.

The runway is needed to make a successful landing.

Helicopter: high cost of application due to the need for production and maintenance of control mechanics, swashplate mechanism, transmission, and gearboxes. High final cost of the end-product. Small flight radius (short flight distance). Low energy efficiency in terms of watt*hr/kg/km (hr=hour).

Multirotor vehicle: low reliability of the automated control system (AuCS). No opportunity to scale the product (to produce larger models), because while conducting a flight it is completely impossible to proactively take necessary maneuvering actions by controlling thrust jerk, acceleration, and rotor angular velocity; the reason is the axial moment of inertia. Low wind resistance. Low energy efficiency in terms of watt*hr/kg/km (hr=hour). An extremely high specific energy intensity of the power supply element (in terms of watt*hr/kg) is required to ensure sufficient flight time is reached and necessary weight share is provided for the target payload.

Aero hybrid: this term includes different variations, as well as attempts to combine multi-rotor vehicles, helicopters with airplanes. This aircraft scheme has the following disadvantages: reduced payload share. Reduced range of acceptable wind loads. Low energy efficiency in terms of watt*hr/kg/km. Low stability in helicopter mode, sometimes it is justified.

Rotorcraft: this term means a type of aircraft in which lift is created by the main wings and the vertical projection of the swept area of the rotors. The disadvantages of this aircraft scheme include: increased complexity of the aircraft's design. An interference pattern of flow around aerodynamic surfaces occurs by an inductive vortex thrown back by main rotors. Increased weight share of the aircraft design. Aerodynamic moments occur due to the complex pattern of the main rotors flow in case of an oblique flow, etc. In relation to the airplane scheme energy efficiency is lower in terms of watt*hr/kg/km.

The above mentioned disadvantages make frequent UAV maintenance mandatory. This requires a team of specially trained UAV operators to provide flight mission control, pass the checklist, and monitor the integrity and serviceability of the UAV.

Finding the most convenient places to operate the UAV, such as for takeoff and landing, is also mandatory. Such places are most often limited by geography and terrain, so a team of UAV operators has to search for a long time for a place to take off and land, otherwise the team puts an expensive vehicle at a high damage risk. All of this increases the overall risk of UAV being damaged, and increases the cost of using unmanned technologies.

Each area of UAV application requires a new type of aircraft that does not have the above mentioned disadvantages. A logical solution to reach a fully automated process and eliminate the human factor is to use a convertiplane-type UAV. Developing a convertiplane is a labor intensive process and has a high entry barrier due to the scientific complexity of the task. That is why highly competent engineers in various fields are required. This is a key to successful implementation of the project.

All currently known developed convertiplane aircraft have the following problems: complexity of the AuCS due to the need for transition mode (when turning the main rotors) to be strictly proportional. High entry barrier due to the scientific complexity of the construction. Complex, expensive and still unreliable systems of engine nacelles' rotary mechanics. In case of a bicopter-type aircraft a swash plate is needed. Low resistance to stress loads.

Reduced payload share due to increased weight of glider, engine nacelles' rotary mechanics and other convertiplane units. Small displacement range of possible center of pressure (CP). Small displacement range of possible center of gravity (CG). For each type of aircraft it is needed to develop separate algorithms to control nonlinear adaptive stabilization systems.

For example, from the prior art a convertiplane is known as an aircraft, which contains a fuselage, wings, and also propulsion groups in the form of engine nacelles placed at the end of each wing. Each of the groups contains a pushing and a pulling propeller and corresponding engines. This convertiplane differs from others in that the pushing propellers are designed to be moved to the position of the least resistance to airflow when the convertiplane transitions to horizontal flight mode, and that the engine of the pushing propeller is turned off (RU 182884 U1, AEROXO Limited Liability Company, Sep. 5, 2018). The main disadvantages of this convertiplane scheme include low energy efficiency, low reliability, complexity, and aerodynamic interference.

To ensure high energy efficiency in both airplane and helicopter modes, the MPG (motor-propeller group) should be optimized in statics and under the incoming flow, which varies greatly within the full speed range of the aircraft. In practice this task is difficult to implement regarding the proposed layout of the convertiplane. This is due to the fact that adding mechanics to any of the engines would require repeating the same technical solution for each of the remaining engine nacelles. This entails not only more complicated mechanics, but also a more complicated AuCS in terms of both algorithms and architecture of control electronics. This leads on average to a tenfold increase of cost of the aircraft and a decrease in reliability.

For the proposed utility model the patent (RU 182884 U1) authors themselves conclude that the propeller loading in airplane mode is insufficient for the presented convertiplane scheme. They emphasize the insufficient energy efficiency of the solution in the airplane flight mode. This could have been avoided by using a mechanism of variable pitch propeller (VPP) on at least two engine nacelles. However, the use of VPP in this case would increase the complexity of already cluttered engine nacelles design, because the flight control scheme is complicated due to two main parameters—thrust vector scalars and their values for each of the engine nacelles, while the classical controls are absent. All together this would lead to decrease in reliability and increase in construction costs. The authors here implemented a compromise solution, which means increasing the load on the swept surface of a part of the involved MPGs by turning off half of the propeller groups and placing coaxially an additional set of MPGs for the airplane mode specifically. The low reliability of the presented convertiplane scheme is caused by several reasons: the need to use rotary mechanics for 4 engine nacelles. Number of rotors is increased, which leads to the installation of a larger number of additional electronic components. So, the more parts, the higher the likelihood of system component failure and loss of control over the aircraft. This requires additional electronics and mechanics redundancy systems to be developed, as well as real-time hardware diagnostics to be implemented.

Let's consider a convertiplane with transverse arrangement of main rotors, by type "Bell V-22 Osprey". Its main disadvantage is the difficulty in ensuring transverse balancing during transition mode, due to the small displacement range of the center of pressure relative to the center of gravity in helicopter mode. This factor greatly complicates the methods of longitudinal and transverse balancing of the aircraft, and accordingly requires more complex executive mechanics and control algorithms of stabilization systems. All together this negatively affects the reliability of the aircraft, as evidenced by the numerous falls.

The layout of the convertiplane according to the scheme type we declare makes it possible to solve the problem of longitudinal, transverse and directional stability, thanks to a wide displacement range of the center of pressure relative to the center of gravity, in both the airplane and helicopter modes. This became possible thanks to the developed aerodynamic layout and the maximum distance of the MPGs from the center of gravity. Such a solution allows for the safe combination of the useful qualities of a helicopter- and an airplane-type aircraft. This opens up opportunities for safe vertical takeoff and landing, high energy efficiency in airplane and helicopter modes, as well as high wind stability.

Advantages of the convertiplane according to the scheme we declare in comparison with classical aircraft schemes are the following: vertical takeoff and landing; axial maneuvering; ability to hover at specified roll and pitch angles with zero resulting velocity vector; ensuring control of the aerodynamic angle of attack when hovering in place under the oncoming flow; simple maintenance infrastructure; high stability; fault tolerance; less weight of the executive mechanics; large share of target load; ease of ensuring energy efficiency in the main flight modes (which are—aircraft mode at the speeds of maximum flight range and flight duration, transition mode and helicopter mode); ability to glide in the air thanks to high lift-to-drag (L/D) ratio; ability to operate in conditions of high wind load; possibility of using various power sources; prepared infrastructure for maintenance is not mandatory; ability to take off and land on sloped surfaces; low susceptibility to turbulence; high maneuverability and controllability; simple algorithms of stabilization and control in transition mode; ability to fly in difficult weather conditions.

The Essence of the Invention

The problem solved by the claimed invention is that the following issues are eliminated: low aircraft stability; complexity of mechanics and control algorithms; low reliability of the aircraft as a whole; low aerodynamic, fuel and economic efficiency. The claimed invention also opens up an opportunity to land and take off from uneven and inclined surfaces, including those with negative angles of inclination on all axes, including rocking and shifting surfaces.

The claimed invention also adds key features such as axial maneuvering that are not available for all other aircraft schemes, including the currently existing convertiplanes.

Thanks to this, it becomes possible to fully automate the processes of launching and landing an aircraft, and performing flight tasks in any operating conditions, without participation of a human operator. Classical aircraft schemes, on the contrary, require constant human intervention during flight control and preflight and postflight maintenance, which does not allow full automation for all operating conditions.

Integration of the developed convertiplane with subsequent full automation of the operation process will not only make it possible to implement unmanned technologies in all areas of potential application, but also increase economic efficiency and exclude the notorious human factor.

The technical result of the claimed technical solution is as follows: increasing stability and reliability; adding the possibility of axial maneuvering; improving aerodynamic, fuel and economic efficiency; simplifying mechanics; simplifying complex control algorithms; full automation of the flight; landing on rocking surfaces; take off and landing on water, uneven surfaces and surfaces with negative slope on all axes, such as ceilings, steep walls, etc.

The technical result is achieved by the convertiplane containing: a fuselage, a control system, aerodynamic wing consoles with aerodynamic control surfaces, front horizontal wing with aerodynamic control surfaces, tail fins, and motor-propeller groups, wherein motor-propeller groups are arranged with the possibility of turning at each end of the front horizontal wing and at the tail fins. At the same time, the convertiplane is designed to ensure the coincidence of the aerodynamic center of pressure and the resulting thrust vector, and also to ensure their mutual dynamic and static scalar control. This control is possible due to operation of aerodynamic control surfaces, and due to control of the thrust vector of each of the motor propeller groups, wherein these motor-propeller groups are arranged on the tips of the front horizontal wing with the possibility of counter-rotation of the propellers and the possibility of providing dynamic displacement of the center of pressure. Also, the motor-propeller groups are designed with an axial degree of freedom. Also, motor-propeller groups are designed to ensure an independent from each other control of thrust vector changing, speed changing and control of the blade pitch angle.

In the embodiment of the claimed technical solution, the front horizontal wing is designed to be reverse-swept.

In the embodiment of the claimed technical solution, the motor-propeller groups are equipped with the mechanism of variable diameter and variable pitch propeller.

In the embodiment of the claimed technical solution, the aerodynamic control elements are designed in the form of ailerons.

In the embodiment of the claimed technical solution, vertical fins are designed at each end of the wing consoles.

In the embodiment of the claimed technical solution, the motor-propeller group located on the tail unit is configured with the ability to operate the propeller in a push mode.

In the embodiment of the claimed technical solution, the convertiplane is designed according to the "canard" scheme or the "tandem" scheme or the "flying wing" scheme.

In the embodiment of the claimed technical solution, control of angular position of the resulting thrust vector is ensured through angular displacement of rotation axis of the front engine nacelles in plane ZX by an angular value "Ω1" in the range from 1 to 45 degrees. This displacement is held in the way that the plane, which is perpendicular to the axis of rotation of the engine nacelles, intersects with the OZ axis of the related coordinate system. Thus, a parallel addition of the MPG thrust vectors is ensured, which provides the possibility of hovering at specified roll and pitch angles.

Aerodynamic Layout (Author's Name "Colibri")—
- airplane part: control of the center of pressure (CP) ensures a high lift-to-drag (L/d) ratio over a wide speed range; anti-spin characteristics; maintaining controllability in critical modes due to control of the resulting thrust vector; control of aerodynamic stability; low susceptibility to turbulence due to the aerodynamic layout;
- helicopter part: wide displacement range of the resulting thrust vector; simplification of electric motor control, the problem of synchronization failure being solved; control of scalar value of the resulting thrust vector; ability to hover at different roll and pitch angles without any movement.

Control of Static and Dynamic Stability of the Convertiplane:

The displacement range of the thrust vector, shown in (FIG. 1), relative to the given center of gravity (CG) of the aircraft is very wide (FIG. 2), which provides the most efficient control scheme of the aircraft.

Vector thrust control is ensured by VPP and VDP of each MPG, with efficiency control by changing the angular speed of the rotor through changing its diameter.

Ability of aerodynamic control when the MPG is switched off, due to the arrangement of aerodynamic control elements.

High energy efficiency is reached due to:
High lift-to-drag (L/D) ratio of the aircraft, being a result of uniqueness of the stated aerodynamic layout. This aerodynamic layout can not be unambiguously classified neither as a "tandem", nor a "canard", nor "flying wing". So it is necessary to introduce a new classification for the aerodynamic scheme developed by the authors and call it "Colibri";

Wind compensation, when energy efficiency increases in the hover mode due to the incoming flow vector is anticipated by aircraft heading and due to aerodynamic loading is decreased by the wings of the motor propeller groups;

The ability to change the angle of attack of the propeller blades for different flight modes, while the thrust vector magnitude of an MPG can be controlled individually, and the MPG energy efficiency can be adjusted according to a set of parameters, changes in thrust vector magnitude being linked to the control system;

The ability to change the propeller diameter of each MPG for each of the flight modes;

The ability to adjust the efficiency parameters of the MPG according to the weight load on the swept surface, to adjust efficiency of the thrust vector control, to dynamically control the load on the swept surface;

A wide displacement range of the center of pressure (CP), through the distribution of the specific load on the main area of the wings by the aerodynamic control elements. It ensures dynamic adjustment of the stability of the aircraft in different flight modes due to changing the distance between the CG and CP. Thus, the maximum L/D-ratio is reached to adjust the aircraft to the current mode of flight;

Decomposition of scalars of the resulting thrust vector into axial components in the projection on the referenced coordinate system. It makes the axial movements of the aircraft possible without changing the roll and pitch angles.

BRIEF DESCRIPTION OF THE DRAWINGS

The details, features, and benefits of the present invention result from the following description of embodiments of the claimed technical solution using the drawings that show:

Figure 1:
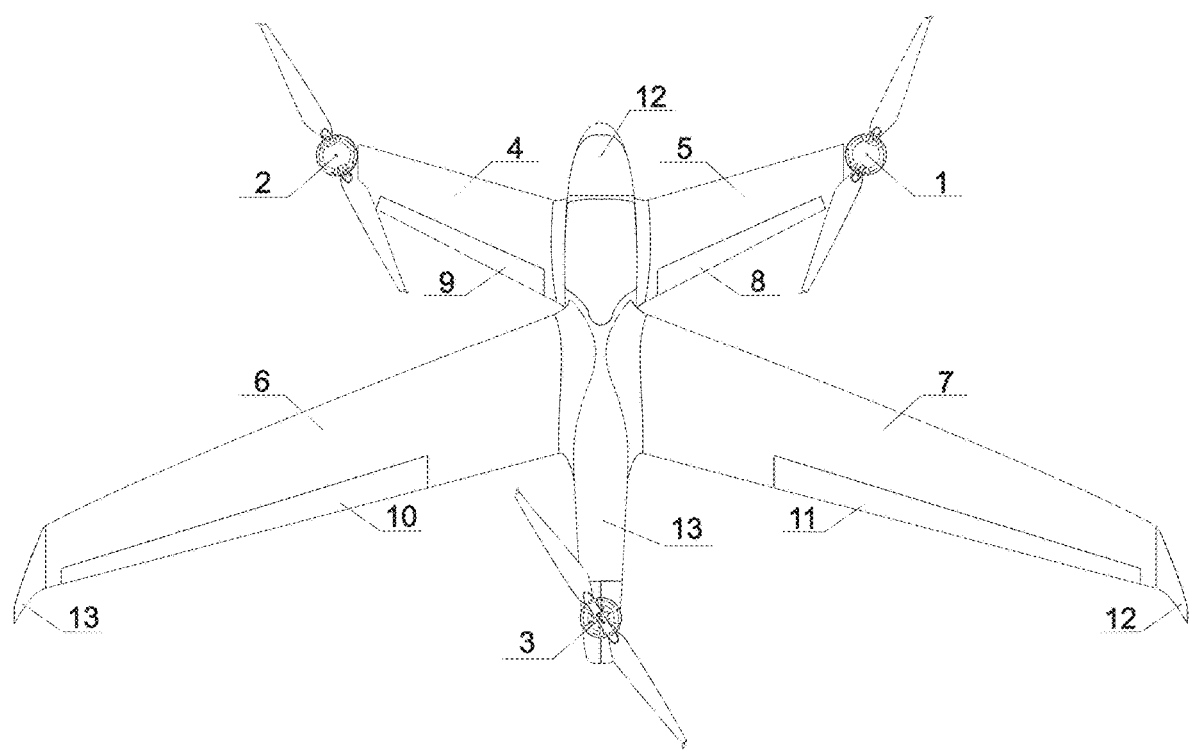
FIG. 1—description of the aerodynamic layout of the convertiplane (top view)
Figure 2:
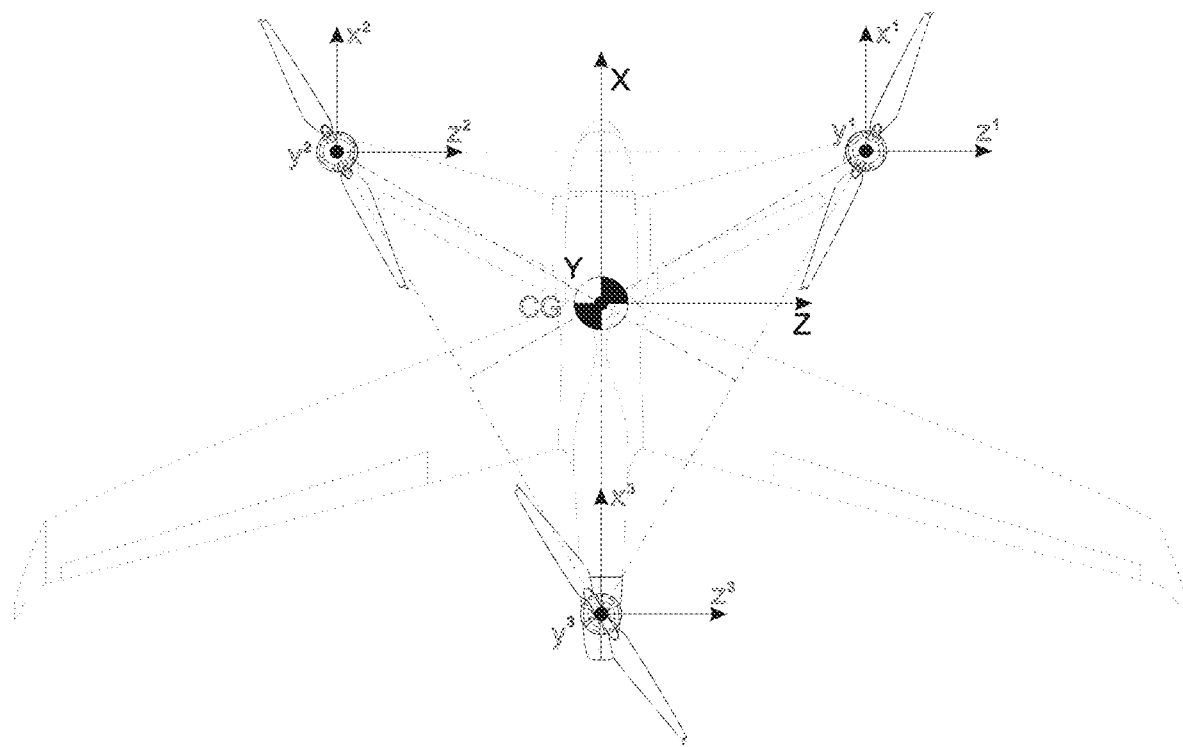
FIG. 2—arrangement of the motor-propeller groups and binding of the motor-propeller group relative to CG.

The following positions are indicated by numbers on the figures:

1—front right motor-propeller group; 2—front left motor-propeller group; 3—tail unit motor-propeller group; 4—front horizontal wing; 5—front horizontal wing; 6—left main wing console; 7—right main wing console; 8—aerodynamic control surface; 9—aerodynamic control surface; 10—aerodynamic control surface; 11—aerodynamic control surface; 12—replaceable payload module; 13—fuselage; 14—vertical fin; 15—vertical fin; 16—point of intersection Terms, Definitions, Used in the Description MPG—motor-propeller group; GCS—(geostationary coordinate system) O0X0Y0Z0, right-handed Cartesian coordinate system, whose axes and its origin are fixed relative to the ground, and are chosen according to the task; FHW—front horizontal wing; ACS—(associated coordinate system) OXYZ, movable coordinate system, the axes of which are fixed relative to the aircraft: OX—longitudinal, OY—normal, OZ—transverse; CS—coordinate system; Angle of attack $\alpha$—the angle between the longitudinal axis of the vehicle and the projection of the velocity vector on the plane OXY ACS;

Roll angle $\gamma$—angle between the transverse axis OZ of the vehicle and the O0Z0 axis of the geostationary coordinate system; Pitch angle—Angle between the longitudinal axis OX and the horizontal plane OX0Z0 of the GCS;

Yaw angle $\psi$—Angle between the axis OX0 of the GCS and the projection of the longitudinal axis OX on the horizontal plane OX0Z0 of the GCS;

CP—the center of pressure, the point of application of the increment of the aerodynamic forces resultant;

CG—center of gravity, the point of application of the force of gravity;

AF—aerodynamic focus, the point of application of the lift force increment;

AuCS—Automatic control system; VPP—variable pitch propeller; VDP—variable diameter propeller; MPG—motor-propeller group X1Y1Z1—associated CS of MPG(1); P1—scalar value of the MPG thrust vector (1); P2—scalar value of the MPG thrust vector (2); P3—scalar value of the MPG thrust vector (3); px—projection of the scalar vector onto the axis OX of the ACS; py—projection of the scalar vector onto the OY axis of the ACS; pz—projection of the scalar vector onto the OZ axis of the ACS; S1—axis of rotation of the engine nacelle with a fixed MPG (1); S2—axis of rotation of the engine nacelle with a fixed MPG (2); S3—axis of rotation of the engine nacelle with a fixed MPG (3); S4—2 axis of rotation of the engine nacelle with fixed MPG3; O1—normal thrust axis in helicopter mode for MPG (1); O2—normal thrust axis in helicopter mode for MPG(2); O3—normal thrust axis in helicopter mode for VMG(3); $\alpha s$—angular deviation relative to the normal thrust vector; R—resultant thrust vector; mg—gravity force.

DISCLOSURE OF INVENTION

Description of the convertiplane glider according to the declared by us aerodynamic scheme. At the very beginning, the aircraft layout based on the "canard" aerodynamic scheme has been chosen for our convertiplane as the most efficient one and also the most convenient one in operation and in layout for onboard systems and units. But this aerodynamic layout did not fully meet the requirements laid down.

Then we made the next modification, but it was no longer a "canard", because it could not have a main front wing, which was used in the next modification of our aerodynamic layout. Therefore, the following aerodynamic layout was based on the "tandem" aerodynamic scheme, which also did not fully meet the required parameters, because the "tandem" scheme has a too small area of the front wing.

As a result, in addition to our use of classical modifications of "tandem", "canard" and "flying wing" aerodynamic schemes, we developed a new unique aerodynamic scheme. It combines the characteristics of all the above mentioned aerodynamic schemes, but at the same time is not any of them. So a new aerodynamic scheme was created, which was called "Colibri".

The chosen scheme ensures relative simplicity of transverse and longitudinal balancing, demonstrates the necessary stability on all axes, and provides an opportunity for aircraft control in a larger displacement range of the center of pressure, if compared with classical schemes. At the same time this new scheme is much safer, because critical modes leading to stall break (flow disruption) and loss of controllability are no longer possible, though they do happen when using classical aerodynamic schemes.

In the embodiment of the claimed technical solution, the convertiplane can also be designed according to a "tandem" or a "flying wing" scheme, depending on the required flight and technical and operational characteristics.

The glider is designed according to the scheme with two front wing swept aerodynamic consoles (6, 7) with tapering and with a necessary set of profiles placed along to ensure elliptical distribution of the lift force. Along the trailing edge of the front horizontal wing (4, 5) and along the trailing edges of the main wing consoles, aerodynamic control surfaces (9, 8) and (10, 11) are placed respectively. They operate in a differential control mode.

In the nose section of the fuselage (13) an easily removable payload (12) is located. Such a layout ensures the largest range of angles for visual observation from onboard.

On the tips of the wing consoles (6, 7) vertical fins are placed (14, 15). They reduce the total aerodynamic drag and increase directional stability (aircraft heading stability).

To ensure a larger range of the possible positions of the center of pressure (and to maintain high energy efficiency while CG is being displaced), the main rotary front horizontal wing (FHW) has been designed to be reverse-swept. The wing airfoils were carefully designed to ensure stable operation under the conditions when an interference pattern of the oblique flow from the front MPGs (numbers 1 and 2) occurs.

To simplify the mechanics the FHW (4, 5) is fixed stationary at the angle of highest L/D ratio, thus ensuring a steady flight mode with a given center of pressure (CP). And also aerodynamic control surfaces (9, 8) on the trailing edge of the FHW (4, 5) are designed to operate in a differential mode. Aerodynamic control surfaces (8, 9, 10, 11) are designed as ailerons operating in differential mode, which ensures control of the aircraft as well as high energy efficiency modes due to longitudinal control of the CP displacement.

The combination of the aforementioned solutions has allowed to shift the critical modes of stall break beyond the operational range of permissible aerodynamic angles of attack of the aircraft. The canard stall (stall from the FHW (4, 5)) in supercritical modes causes the CP to shift from the CG towards the aft fuselage. This causes a dive moment, which leads to the aircraft gaining, so the aircraft itself returns to the operational range of permissible angles of attack. Thus we get a highly stable aircraft scheme, with high L/D ratio and a wide range of permissible speeds while maintaining controllability in critical flight modes.

The layout of the claimed convertiplane glider has three cruising (mid-flight) electric motors, with VPP and VDP placed on them. They are located on the rotary engine nacelles, which provide angular deflection relative to the normal axis of the thrust vector, thus enabling full-fledged control of the thrust vector itself. Two of the three motor-propeller groups (1, 2) are located on the wingtips of the front horizontal wing (5 and 4 respectively) and the third motor-propeller group (3) is located at the aft fuselage (13).

The tricopter scheme with the thrust vector control is the most efficient one in terms of energy, is easy to balance laterally and longitudinally, and is stable and reliable.

Synchronizing the operation of the MPGs (1, 2, 3) through the AuCS ensures control over the resulting thrust vector, thus forming a wide range of the thrust vector displacement, the range being enclosed in a triangle with the MPGs as its vertices.

Each of the MPGs is equipped with its own actuator mechanism, thus allowing independent changes of the thrust vector for each MPG. At the same time, the independent control of each MPS through the AuCS is based on the following parameters: motor-propeller group rotation speed; axial control of the thrust vector; control of the blade pitch angle; control of load on the swept surface of the rotor through VDP.

The distance between the MPGs, their weight and positions are calculated and selected in such a way as to preserve the axial moments of inertia of the aerodynamic scheme, without generating resonance phenomena and without aggravating the interferential pattern of the flow from the MPGs around the glider. Because if resonance is not eliminated and if interference aggravates, all together leads to destabilization of the aircraft in the main flight modes.

Figure 8:
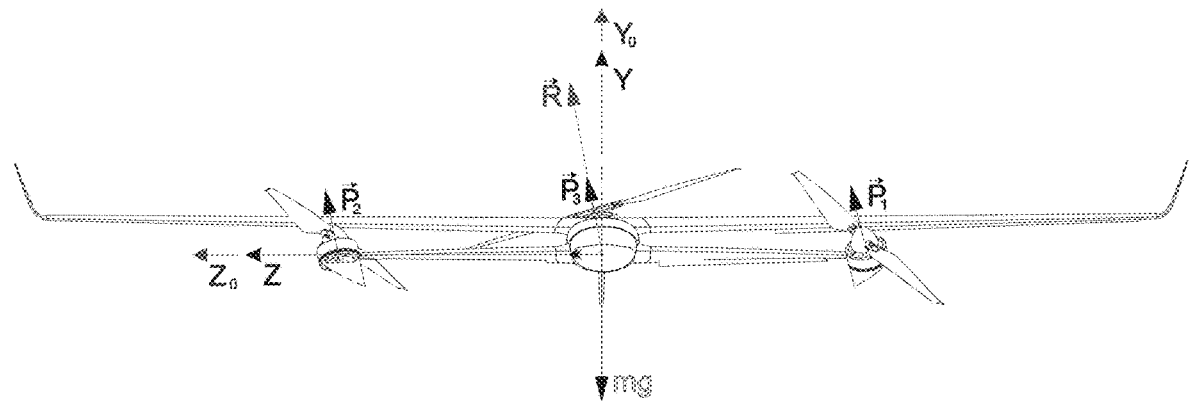
FIG. 8—scheme of summation of the resulting thrust vector forces in front projection during transverse movement without roll.

The wide displacement range of the resulting thrust vector ensures high stability of the convertiplane aerodynamic scheme in helicopter and transition (or hybrid) flight modes. And the control over angular component of the resulting thrust vector relative to the normal thrust vector provides high controllability and opens new possibilities for controlling roll and pitch of the aircraft during the flight at zero velocity vectors, i.e. in one place without axial displacement (FIG. 8, 9). The blades of the MPGs (1, 2, 3) have aerodynamic rebalancing opportunities in the form of VPP and VDP mechanics. Such a solution allows to rebalance the propeller blades and to implement algorithms for adapting energy efficiency in different flight modes.

Figure 4:
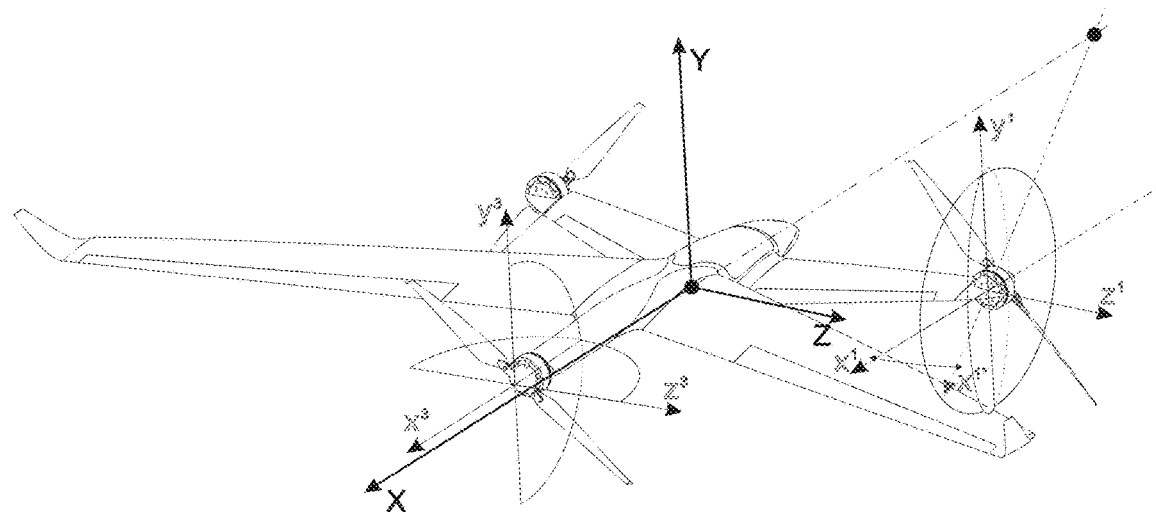
FIG. 4—angles of the thrust vector control of the motor-propeller group.
Figure 5:
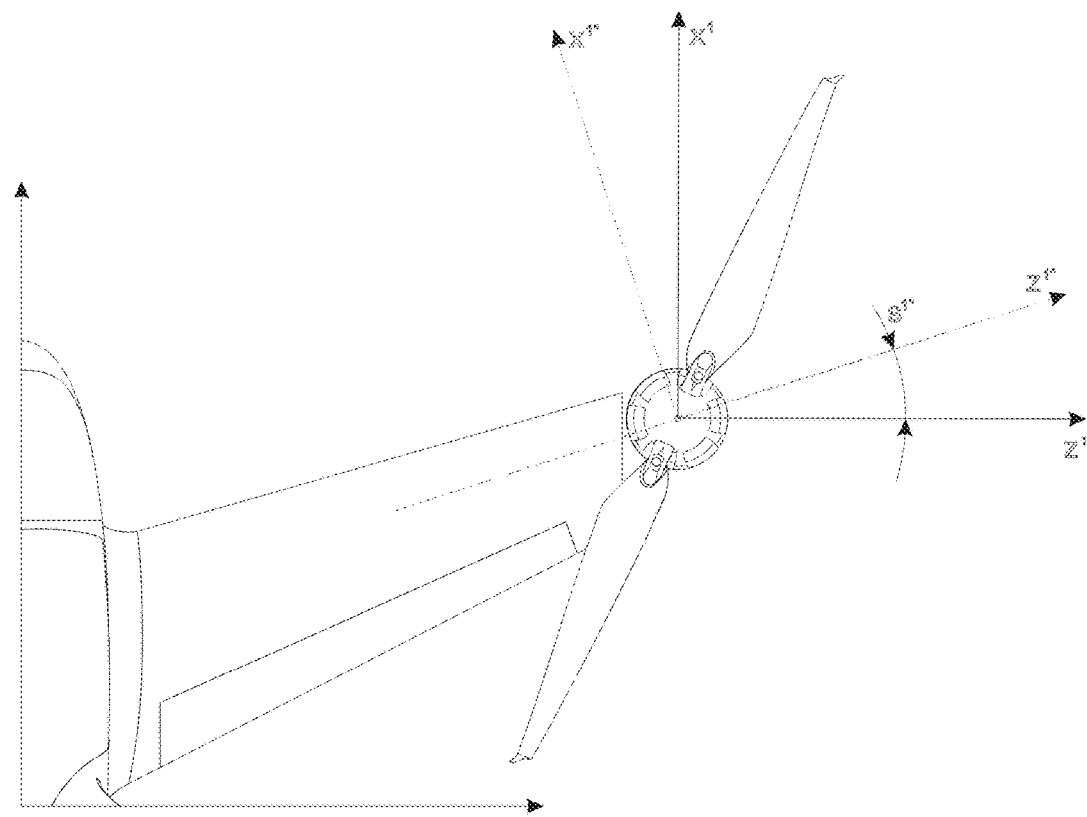
FIG. 5—range of displacement of the rotary axis and the rotary nacelle of the motor-propeller group 1, 2.
Figure 9:
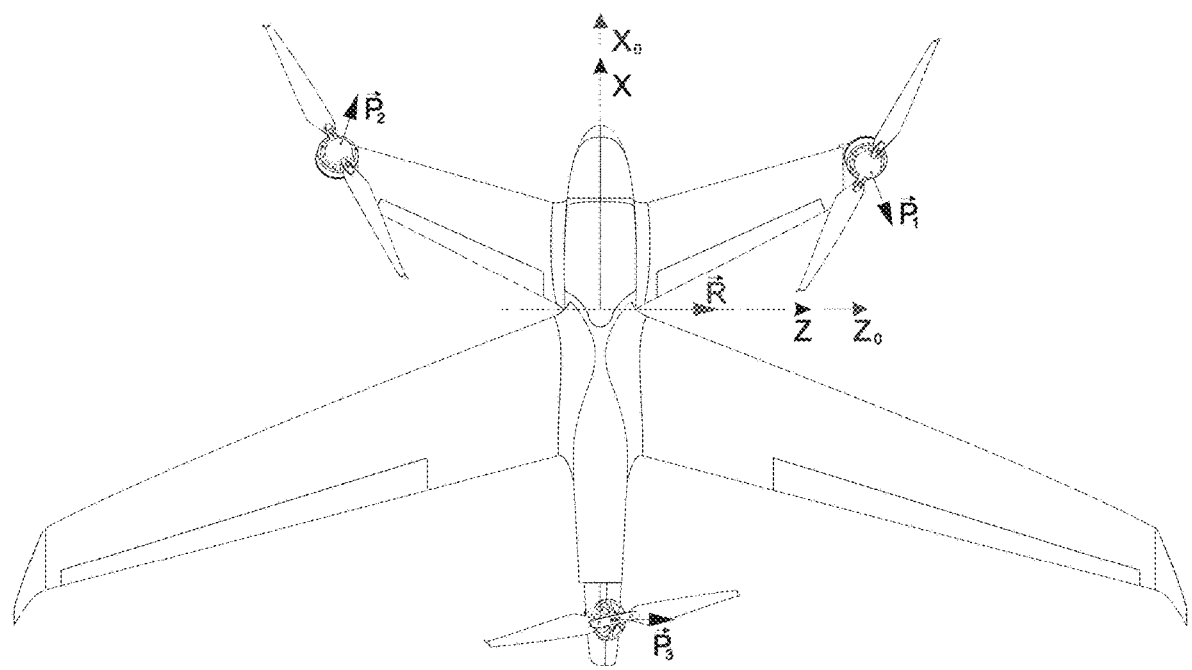
FIG. 9—scheme of summation of the resulting thrust vector forces in top projection during lateral movement without roll.
Figure 10:
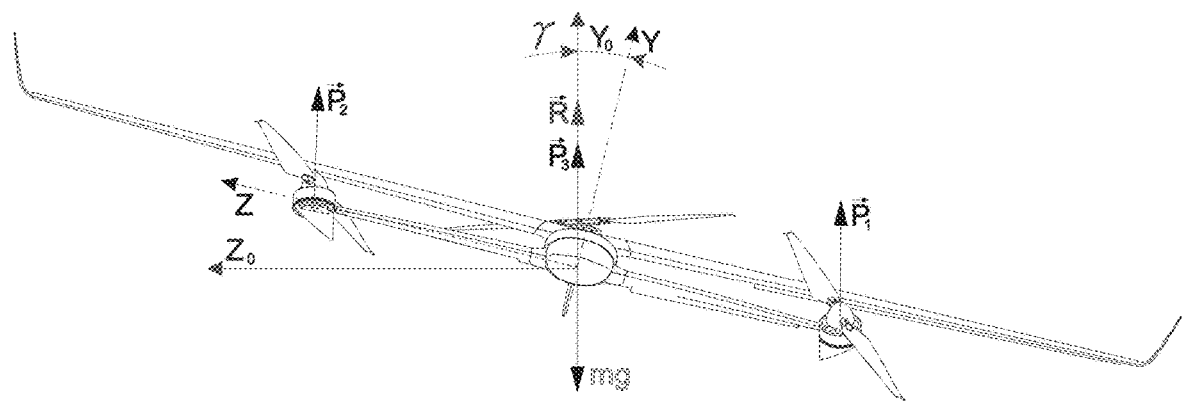
FIG. 10—scheme of summation of the resulting thrust vector forces in front projection during static hovering at a given roll angle.

The axial degrees of freedom of the MPGs, meaning displacement of the axes of rotation of the MPG (1 and 2) on the angular value S1 within 1 to 45 degrees on both directions in the plane ZX, are designed in such a way that the planes of rotation of the MPG 1 and 2 intersect in the point illustrated in (FIG. 4,6). Thus this layout provides the possibility of parallel addition of thrust vectors under the given angular position of the resulting thrust vector. It also provides independent control of the thrust vector value and of its angular position relative to the normal axis of the thrust vector (FIG. 9 designation y). Through scalar addition of vectors, their calculated angular position and their required value, the AuCS ensures control of the resulting thrust vector, thus providing the following possibilities:

changing the angle of the thrust vector around the longitudinal and transverse axes of the aircraft. Ensuring controlled angular changes of the resulting thrust vector opens up a possibility to maneuver without changing roll and pitch angles (FIG. 8, 9);

hovering in place at the required roll and pitch angles (FIG. 10, 11), performing landings on surfaces that are inclined to the horizon or dynamically change their angle. Also such a control scheme is most suitable for landing on the swinging deck of a vessel, or providing compensation for wind and turbulence acting on the aircraft without using conventional roll and pitch maneuvering.

The wide range of displacement of the thrust vector shown in (FIG. 3) provides high maneuverability and controllability of the convertiplane. The resulting thrust vector can have a position coinciding with the center of mass, thereby ensuring neutral stability which improves controllability of the aircraft in hybrid mode. The CP can have a position slightly behind (and ahead) the CG, thereby ensuring aerodynamic stability of the aircraft. When the conditions of aircraft static and dynamic stability are met, aerodynamic stability contributes to higher energy efficiency of the flight in the airplane mode. The dynamic change of the CP in the hybrid mode is provided by the fact that the loading of the aerodynamic surfaces is decreased by the rotors and vice versa (unloading the rotors by the wings).

Thus we obtain the layout of the convertiplane glider according to the declared scheme, which is the most controllable of all currently existing schemes and which provides the highest stability with simple stabilization algorithms. Moreover, in maneuvering mode, it provides the highest energy efficiency and simplicity in ensuring stability under the influence of external factors. For clarity, let us consider several options of scalar addition of thrust vectors.

The case of controlled movement along the transverse axis of the convertiplane with a fixed horizon. Here the axes of the GCS and the ACS coincide, and also roll, pitch and yaw angles are zero. The angular deviation and the value of vectors P1, P2 and P3 provide zero resulting moment and a transverse component, whose projection lies on the OZ axis. As a result, this sets the convertiplane in motion along its transverse axis (FIG. 9).

Figure 11:
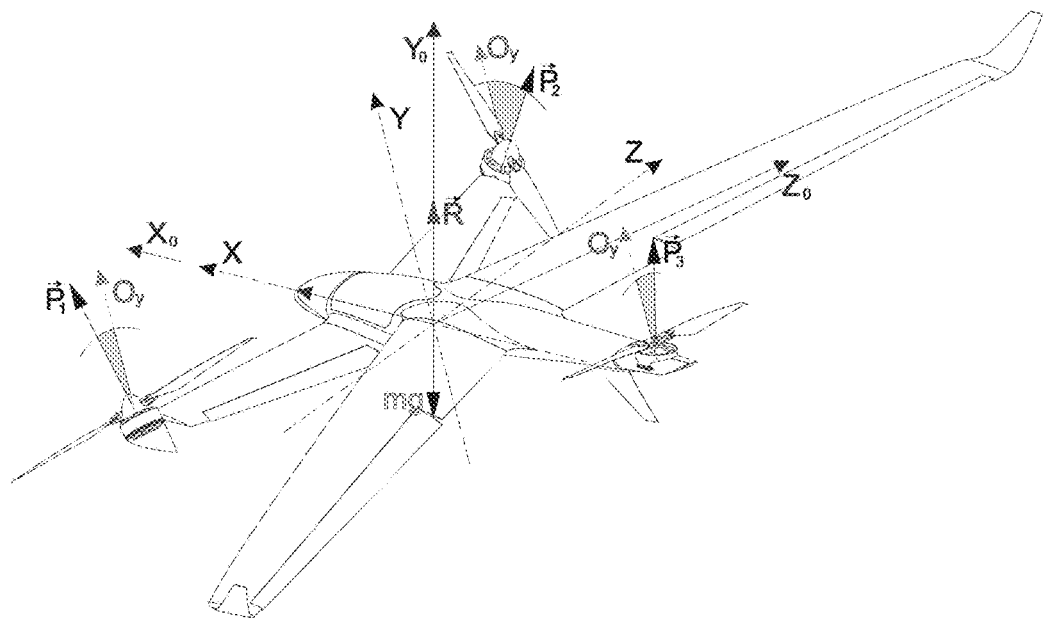
FIG. 11—scheme of summation of the resulting thrust vector forces during static hovering at a given roll angle.

The case of providing angular deviation in roll followed by hovering in place at a required angle. The value of the thrust vectors P1, P2 and P3 leads to a change in roll (FIG. 11). An independent angular deviation of each of the thrust vectors by the values a, b, c leads to the compensation of the resulting moment. At the same time, the resulting thrust vector is collinear to the normal axis of the GCS and compensates the force of gravity acting on the convertiplane. Such a condition ensures an equilibrium state of the convertiplane at a given roll angle with a zero resultant velocity vector.

Figure 6:
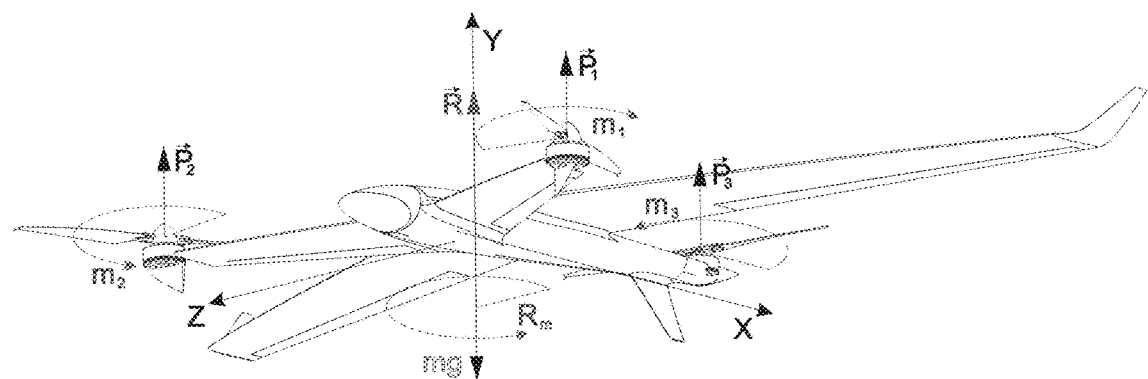
FIG. 6—scheme of application of forces and moments in the steady flight in a helicopter mode.

Flight Modes of the Declared Convertiplane:

Helicopter mode: the weight of the aircraft is compensated by the lifting force of the three rotors (FIG. 6) (forces P1, P2, P3) together forming a resultant force that compensates for the weight of the aircraft. Two front rotors (1, 2) have counter rotation. Such a direction of rotation is determined by additional increase in the velocity gradient on the wing surface. Thus, the right front engine (1) rotates counterclockwise, the left front engine (2) rotates clockwise.

Figure 3:
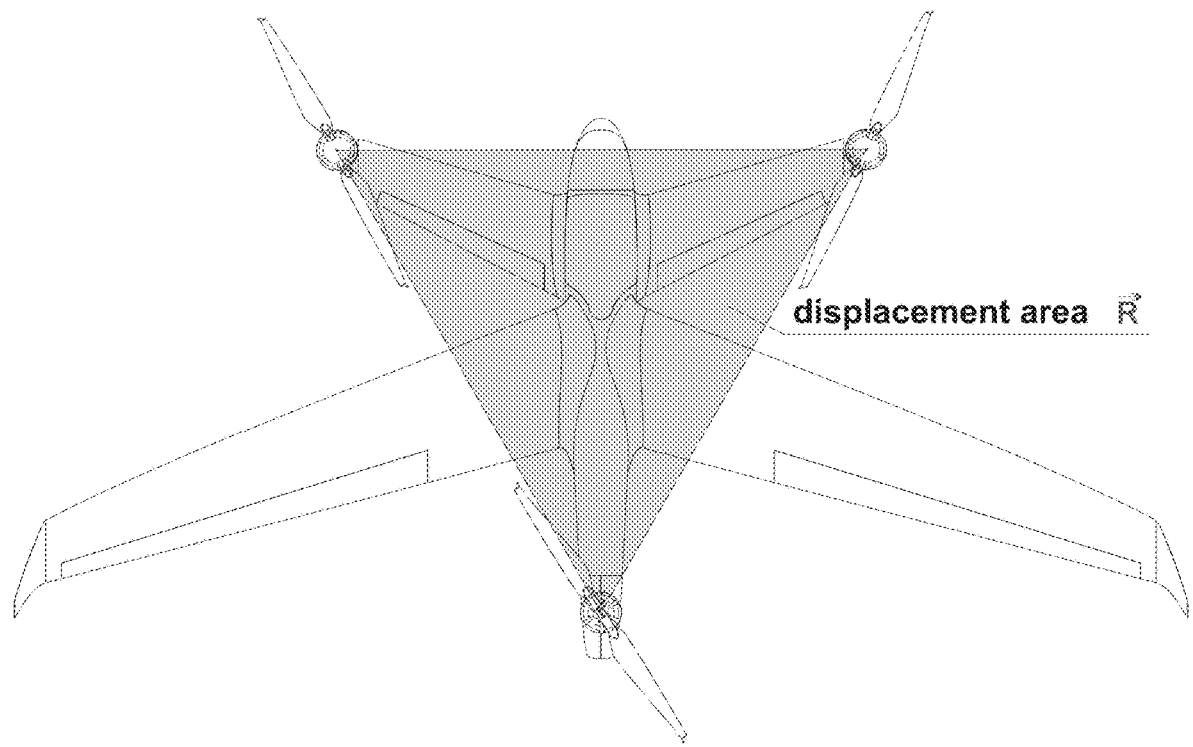
FIG. 3—displacement area (range) of the resulting thrust vector.

The direction of rotation of the tail rotor (3) can be either clockwise or counterclockwise. Stability is provided by the dynamic displacement of the center of pressure and the different thrust of the rotors (the area of CG movement is shown in FIG. 3).

Figure 12:
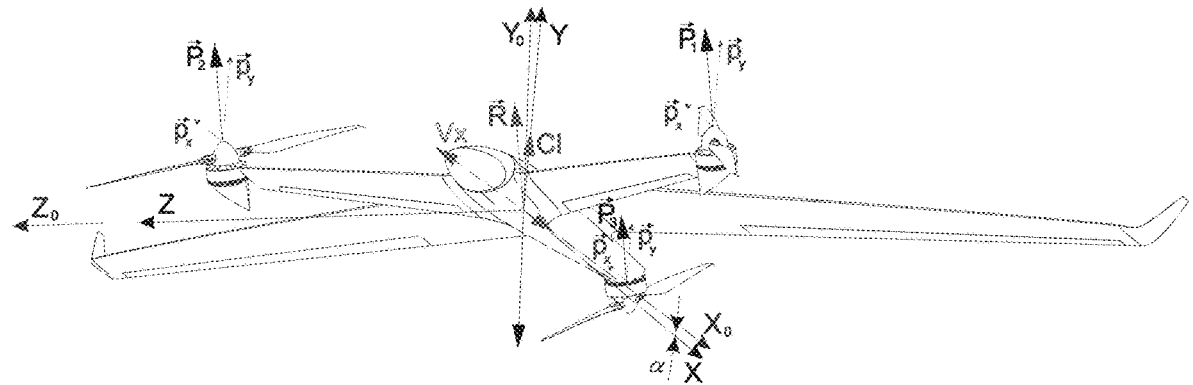
FIG. 12—scheme of application of forces in hybrid flight mode.
Figure 13:
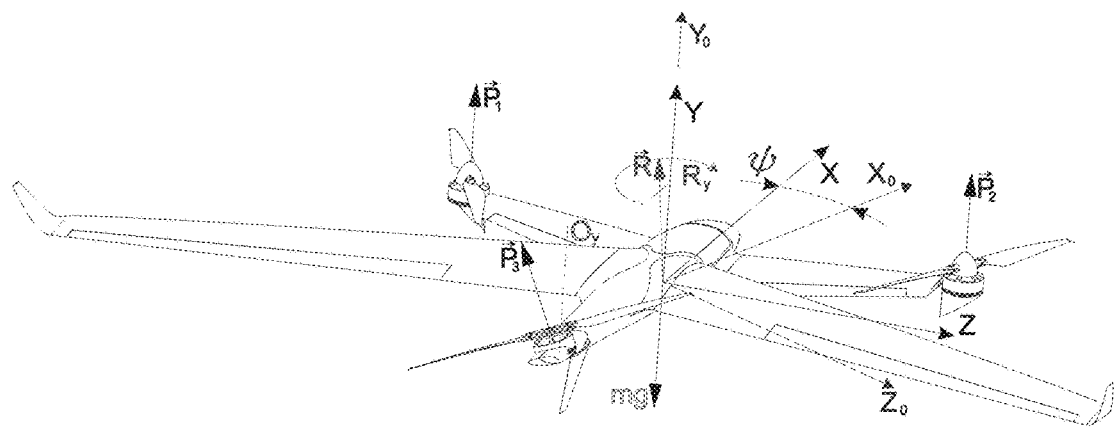
FIG. 13—scheme of application of forces and moments during directional control (aircraft heading control)
Figure 14:
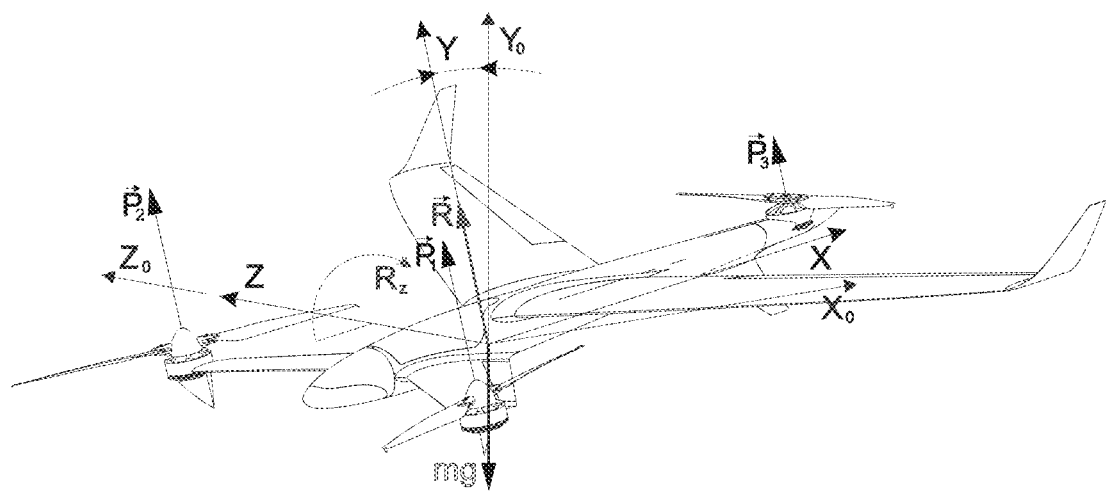
FIG. 14—scheme of application of forces and moments during pitch control.
Figure 15:
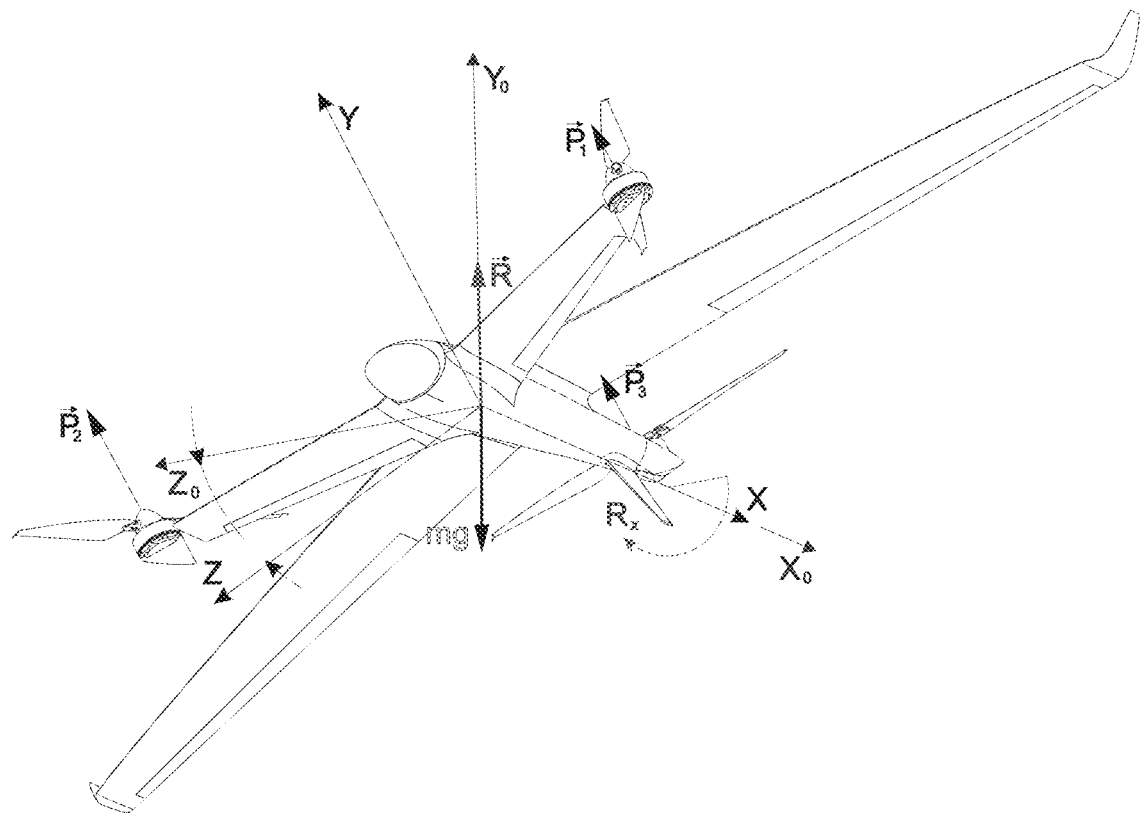
FIG. 15—scheme of application of forces and moments during roll control.

Transition (or "hybrid") mode: When the horizontal velocity component Vx increases, aerodynamic forces act on the surface of the convertiplane. That's due to the component of the rotor lifting force Fx, which occurs as a result of turning the engine nacelles around the transverse axis of the aircraft. The resultant of these aerodynamic forces, for convenience of perception, is decomposed into the lifting force Fl and the drag force Fd. With an increase in the velocity component Vx, there is an increase in aerodynamic forces that contribute to the compensation of the MG force (gravity force/own weight of the convertiplane), while the drag force Fd being "value of L/D ratio" times less than the MG force. All of this allows to fulfill a complete transition to the airplane mode using wings as an aerodynamic support, or vice versa, to fulfill a smooth deceleration with transition to the helicopter mode. The transition mode itself can be used as the main flight mode of the convertiplane. Thanks to a relatively large range of displacement of the CP, it is easier to ensure the controllability of the convertiplane, which allows flying in conditions of increased wind load, turbulence or when high maneuverability is required. The transition process is carried out through longitudinal tilt of the tail rotor, of the two front rotors, or all of the rotors simultaneously or separately. When carrying out the transition mode through longitudinal rotation of the tail rotor, its initial position should be from below (FIG. 12).

Figure 7:
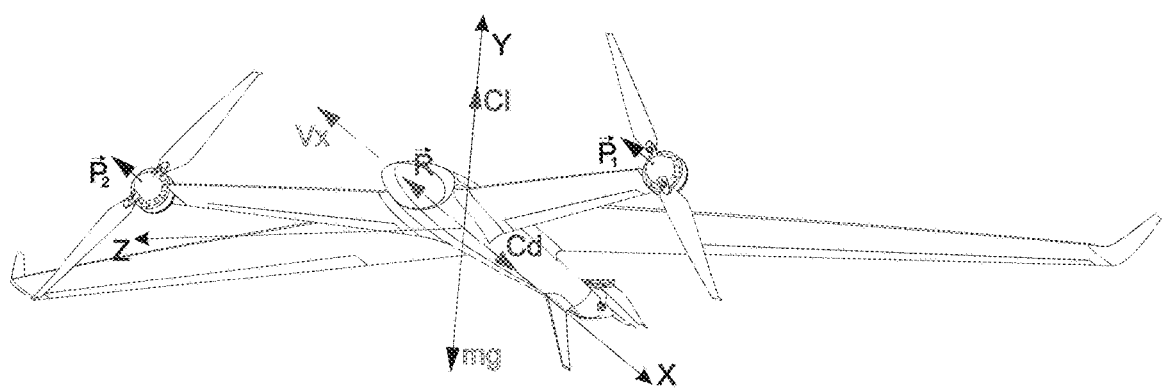
FIG. 7—scheme of forces application in the fixed-wing aircraft mode.

Airplane Mode:

The condition of the "steady flight" mode at the target velocity Vx is achieved by: 1) bringing the sum of aerodynamic forces Fd to an equilibrium with the resulting thrust vector R formed by components of forces F1 and F2; 2) bringing MG force to an equilibrium with the lifting force Fl created by the main wing consoles (6, 7) and the FHW (4, 5), which completely compensate the weight of the aircraft MG; 3) a longitudinal thrust vector of the engines being a sum of forces F1 and F2 (provided by longitudinal tilt around transverse axis of the aircraft), this thrust vector compensates aerodynamic drag force Fd at a speed Vx that ensures the highest efficiency. Control in this mode is provided by aerodynamic control surfaces (8, 9, 10, 11), as well as thrust vectors (FIG. 7).

In the embodiment of the claimed technical solution, it is possible to use a tail mechanism having two degrees of freedom so that to provide simultaneously directional control and to decompose the scalar of the thrust vector on a longitudinal component. If the motor is located at the bottom side of the engine nacelle and if the propeller works in a pushing mode, it is possible to use a tail rotor in both airplane and helicopter modes.

Such a need may arise in such a case, when it is necessary to increase the specific energy capacity in airplane mode, for example, to provide high-altitude flights or to improve the accuracy of the aircraft positioning when hovering at different angles.

Ensuring Sustainability

Helicopter Mode:

Roll: in case of an angular error relative to the horizon, the ACS ensures a preemptive roll action, resulting in an increase in lifting force P1 and a decrease in lifting force P2 of the MPGs 1 and 2 respectively. As a result a leading moment "My" arises, bringing the convertiplane back to an equilibrium mode.

Pitch: in case of an angular error relative to the horizon, the ACS provides a preemptive pitch action resulting in an increase in lifting forces P1, P2 and a decrease in lifting force P3 of the MPGs 1, 2 and 3 respectively. As a result a leading moment "Mx" arises, bringing the convertiplane back to the equilibrium mode.

Yaw: in case of an angular error relative to the aircraft heading, the ACS provides a preemptive action by tilting the actuators of the rotary engine nacelles by an angular value necessary to compensate for the angular error. As a result a leading moment "Mz" arises, bringing the convertiplane to the required azimuth position, returning it to the set aircraft heading angle.

Stability: the aerodynamic layout of the aircraft is designed the following a way. When an external impact on the aircraft in a steady flight mode occurs, resulting in angular deviation along the longitudinal axis, the equilibrium of the forces system is disrupted. So, the aerodynamic control elements create the resulting aerodynamic moments, thus leading to a preemptive impact.

The transition mode is such a combination of mechanical and aerodynamic processes affecting the aircraft, that makes the aircraft fulfill the transition from the helicopter flight mode to the airplane flight mode and vice versa. Let us consider the main stages of the transition mode: Initial phase—hybrid mode: at the initial stage of the transition mode, to ensure that the resulting thrust vector coincides with the longitudinal axis of the convertiplane, the rotors perform a longitudinal tilt, spreading the thrust vector so as to ensure the balance of gravity and lift forces. At the same time, an additional thrust vector arises that contributes to the aircraft gaining speed. As a result, an aerodynamic component is generated due to the oncoming flow over the wing, which in turn creates a transverse moment causing the convertiplane to pitch up. At this moment the rotors already assume the "airplane" position and the convertiplane starts to fly in an airplane mode. Stability in this mode is ensured by the different thrust of the rotors that provide lifting force by compensating in antiphase the moments of external forces and the inertia of the aircraft. Thereby it counteracts the destabilizing forces that generate the moment that would otherwise disrupt the system. Such a mode is advantageous for ensuring controllability at low speeds and in critical conditions for aerodynamic surfaces, while the surfaces themselves provide lift, but cannot stall. This solution ensures safe control of the convertiplane in transition modes.

The final phase is aerodynamic control: as there is an oncoming flow over the wing, an aerodynamic component is generated, which in turn creates a transverse moment causing the convertiplane to pitch up. At this moment the rotors already assume the "airplane" position and the convertiplane starts to fly in an airplane mode. In the final stage, when lift is fully provided by aerodynamic surfaces, the convertiplane fully transitions to aerodynamic control. In this mode, the convertiplane has the highest energy efficiency, and the motor propeller groups work in the energy efficient mode, providing the necessary force to maintain the steady flight mode.

The invention claimed is:

1. A convertiplane comprising:
   a fuselage comprising a front horizontal wing and a tail unit;
   a control system;
   airfoil sections with aerodynamic control surfaces;
   a front horizontal wing with aerodynamic control surfaces;
   tail fins; and
   motor propeller groups comprising propellers, the motor propellor groups being located such that the propellers are configured to rotate at tips of the front horizontal wing and on the tail unit,
   wherein a center of aerodynamic pressure and a resulting thrust vector of the convertiplane are coincident and are mutually dynamically and statically scalarly controllable through the operation of the aerodynamic control surfaces and through control of the thrust vector of each of the motor propeller groups,
   wherein the motor propeller groups located on the tips of the front horizontal front wing are configured to counter-rotate the propellers and to provide dynamic shifting of the center of pressure,
   wherein the motor propeller groups comprise an axial degree of freedom and are configured such that a thrust vector, a rotation speed, and a blade pitch angle of each motor propeller group is independently controllable relative to the other motor propeller groups.

2. The convertiplane according to claim 1, characterized in that the front horizontal wing is configured to be reverse swept.

3. The convertiplane according to claim 1, characterized in that the motor propeller groups are equipped with the propeller mechanics of variable pitch propeller and variable diameter propeller.

4. The convertiplane according to claim 1, characterized in that the aerodynamic control surfaces are made in the form of ailerons.

5. The convertiplane according to claim 1, characterized in that wing consoles each comprise a vertical fin at an end thereof.

6. The convertiplane according to claim 1, characterized in that the motor propeller group located on the tail unit is configured with the ability to operate the propeller in a push mode.

7. The convertiplane according to claim 1, characterized in that it is designed according to a canard scheme or a tandem scheme or a flying wing scheme, or according to a colibri scheme.

8. The convertiplane according to claim 1, characterized in that the resulting thrust vector is controlled through shifting the axis of rotation of front engine nacelles in the plane ZX by an angular value S1 in the range of 1 and 45 degrees on both ways,
   wherein the shifting of the axis of rotation is held such that the plane of rotation of the engine nacelles intersect with the axis Z of the associated coordinate system at a point, which provides a parallel addition of the thrust vectors of the respective motor propeller group at roll and pitch angles.

9. The convertiplane according to claim 1, characterized in that the displacement range of the resulting thrust vector is enclosed in a triangular area formed by the position of the motor propeller groups.

* * * * *